Patented Sept. 20, 1949

2,482,197

UNITED STATES PATENT OFFICE 2,482,197

MOTION-PICTURE APPARATUS OF THE OPTICAL COMPENSATING TYPE

Luther W. McGinty, Chattanooga, Tenn., assignor to Leventhal Patents, Inc., Chattanooga, Tenn., a corporation of Delaware Application April 9, 1946, Serial No. 660,646

8 Claims. (Cl. 88—16.8)

This invention relates to motion picture apparatus and more especially to projectors in which the film moves uninterruptedly across the optical axis and the screen images are rendered stationary by optical compensation.

The co-pending application of Jacob F. Leventhal, Serial No. 656,196, filed March 22, 1946, now Patent No. 2,440,776, issued May 4, 1948, discloses a motion picture projector in which an optical compensator produces two successive spaced virtual images of a film picture while it is being advanced uninterruptedly across the optical axis in combination with optical means including a movable optical unit for reimaging said virtual images as real images in registering relation at the screen plane. An object of this invention is mechanism for effecting actuation of said optical unit in timed relation to the advancement of said film.

Other objects, novel features and advantages of this invention will become apparent from the following specification and accompanying drawings, wherein.

Figure 1:
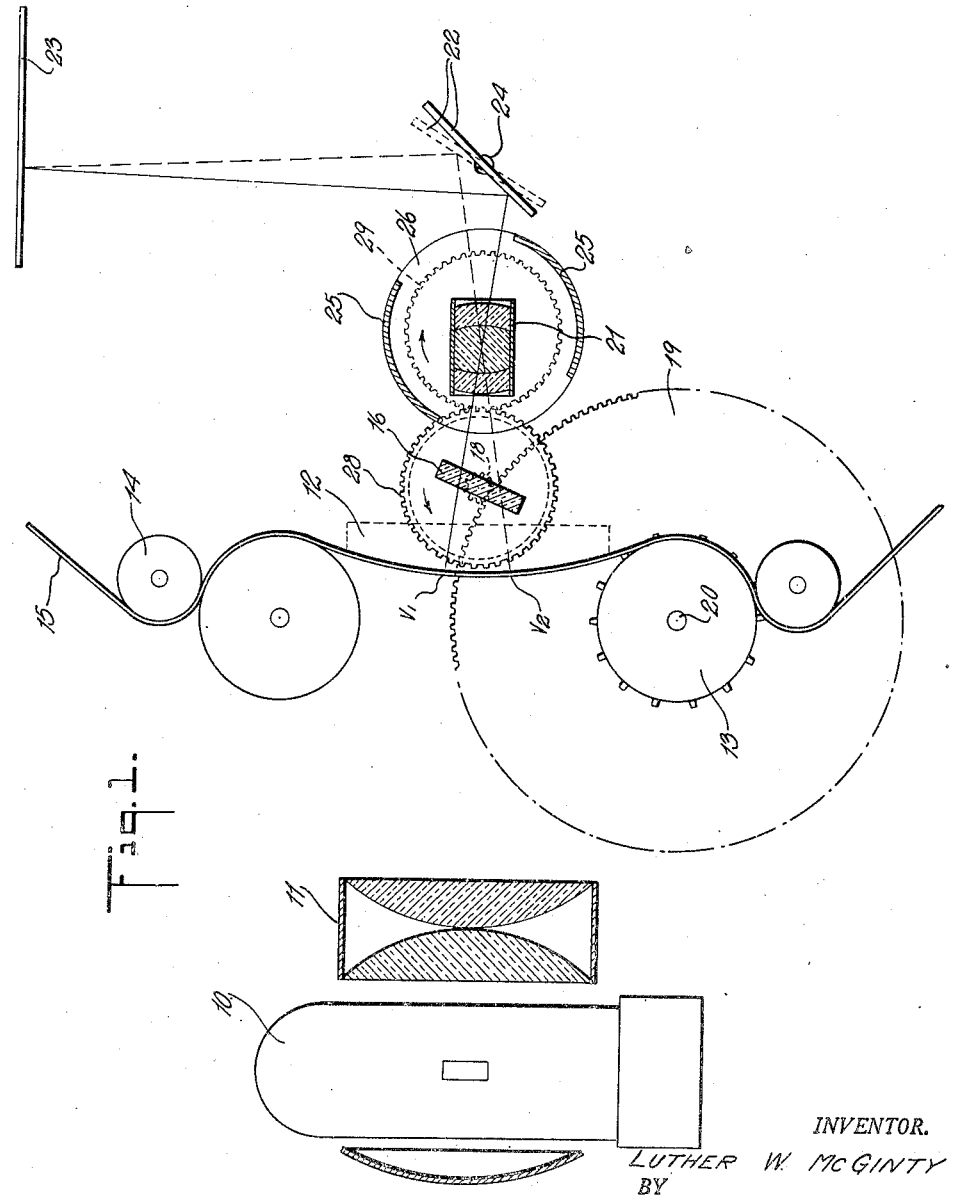
Fig. 1 is a diagrammatic section in the direction of film travel of a projector embodying the invention.
Figure 2:
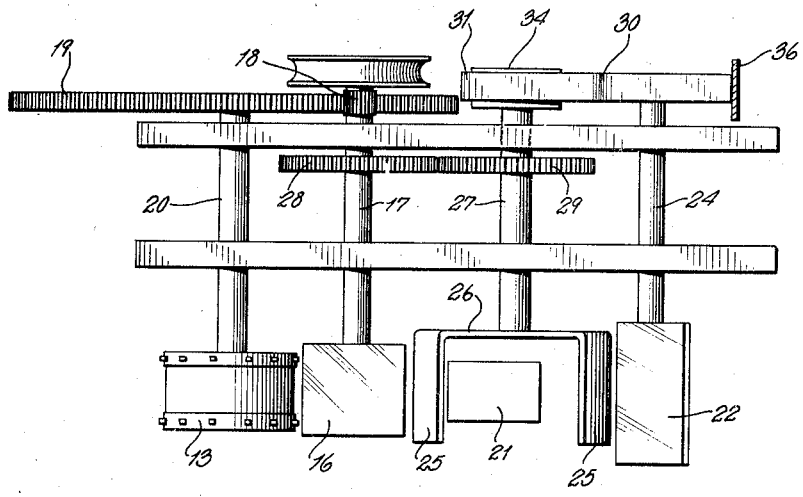
Fig. 2 is a plan view of such apparatus.

A source of light 10 has a condenser lens 11 associated therewith to direct light from the source 10 through the film gate 12. A sprocket 13 co-operates with a retaining roller 14 to draw a film 15 across the gate 12. An optical compensator 16 is rotatably mounted just beyond the film gate in position to interrupt the light beam passing from the lens 11 through the film gate. The compensator 16 is mounted on a shaft 17 to which is attached a pinion 18 meshing with a gear 19 fixed to the shaft 20 by which the sprocket wheel 13 is supported. The pinion 18 and the gear 19 are in such ratio that a single picture frame crosses the optical axis of the projector for each complete revolution of the compensator 16, thereby forming two successive spaced virtual images V₁ and V₂ separated in time from each other as disclosed in Leventhal Patent No. 2,067,771.

A stationary objective lens 21 is provided for producing real images of such virtual images and a mirror 22 is provided for effecting registry of such real images in the screen plane 23. The mirror 22 is oscillated between two positions, in one of which it redirects light for producing a real image of one of the virtual images and in the other of which it redirects light for producing the real image of the remaining virtual image. The reflector 22 is rigidly fastened to a shaft 24 preferably, though not necessarily, arranged in the front focal plane of the objective lens 21. Means, later to be described, are provided for effecting oscillation of the mirror 22 between the two positions above mentioned.

An obturator is provided for interrupting the light beam twice for each complete revolution of the compensator 16. This obturator consists of a pair of coaxial diametrically opposed arcuate shields 25 projecting from one face of a plate 26 supported by a rotatable shaft 27 parallel to the shaft 24. The shields 25 are rotatable around the objective lens 21 to pass alternately between the compensator 16 and the lens 21 to interrupt the flow of light from the lens 21 at such time as the compensator 16 is in positions in which the production of virtual images is accompanied by undesirable effects. Rotation of the obturator is effected through the medium of a gear 28 on the shaft 17 and a gear 29 on the shaft 27; these gears having a one-to-one ratio.

Figures 3, 4:
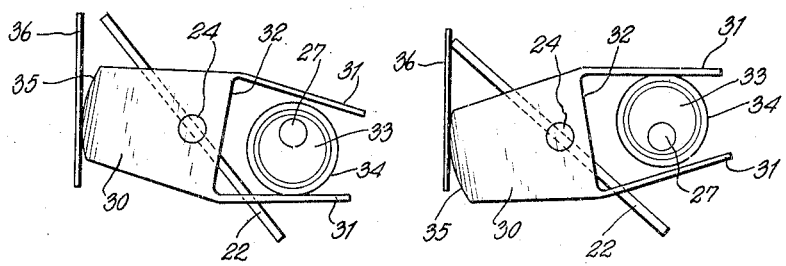
Fig. 3 is a rear elevation of a portion of such apparatus with certain parts in one position.
Fig. 4 is a view similar to Fig. 3 with said parts in another position.

A lever 30 is fixed to the shaft 24 and at one end is provided with a pair of arms 31 converging outwardly to form a notch 32. The shaft 27 eccentrically supports the inner race 33 of a ball bearing having its outer race 34 adapted to engage the arms 31 with clearance between one arm and the outer race member when the other arm engages the outer race member. Rotation of the shaft 24 effects movement of the periphery of the race member 34 toward and away from the arms 31 along a line perpendicular to a line joining the axes of the shafts 24 and 27, thereby causing oscillation of the lever 30 between the two positions shown in Figs. 3 and 4 by engagement of the outer race 34 with the arms 31 to oscillate the mirror 22. The width of the notch 32 is somewhat greater than the outer diameter of the race member 34 so that the lever 30 has two stationary periods for each complete rotation of the shaft 27. Also, the convergence of the arms 31 is such that a half revolution of the shaft 27 is required for effecting movement of the lever 30 in either direction between its two extreme positions. The lever 30 is provided with an arcuate surface 35 concentric with the shaft 27 and a leaf spring 36 bears against said surface. The spring 36 frictionally opposes the oscillation of the lever 30 and tends to retain it at rest.

In the operation of the projector, the shaft is driven at constant speed by any suitable means, thereby causing one complete rotation of the compensator 16 during passage of one film picture across the optical axis of the projector and one complete rotation of the obturator to interrupt the light beam twice for each complete rotation of the compensator 16. Each half revolution of the shaft 27 causes movement of the lever 30 from one of its two positions of rest to its other position of rest and the spring 36 maintains the lever at rest during the period in which the outer race 34 moves from contacting relation with one arm to contacting relation with the other arm. The spring also serves to prevent movement of the lever 30 under its own inertia after contacting relation of the outer race 34 with an arm has been discontinued. The clearance between the ball race 34 and the arms 31 is such that the mirror 22 remains stationary except during the period that the obturator is in position to interrupt the light beam. The timing is such that the mirror is moved from one position to the other during the period that the obturator is interrupting the light beam and any vibration that may develop in the mirror is dissipated before the obturator has ceased to function. The mirror is completely detached from its driving mechanism during the period of picture projection so that during this period it is absolutely stationary.

I claim:

1. A device of the character described comprising a carrier movable between a first position and a second position, and a rotatable eccentric, said carrier being equipped with plane surfaces spaced apart a greater distance than the eccentric diameter and engageable by said eccentric periphery to effect movement of said carrier from its first to its second position during the initial portion only of a first half revolution of said eccentric and from its second to its first position during the initial part only of the next half revolution of said eccentric, and friction means opposing movement of said carrier in either direction.

2. A device of the character described comprising a carrier movable between a first and a second position, means including a rotatable eccentric for applying force from the eccentric to the carrier during the initial portion only of a half revolution of said eccentric to advance said carrier from its first to its second position and during the initial portion only of the successive half revolution of the eccentric to return said carrier from its second position to its first position, and friction means opposing movement of said carrier in either direction.

3. A device of the character described comprising a carrier movable between a first and a second position, means including a rotatable eccentric for applying force from the eccentric to the carrier during the initial portion only of a half revolution of said eccentric to advance said carrier from its first to its second position and during the initial portion only of the successive half revolution of the eccentric to return said carrier from its second position to its first position, and means for retaining the carrier stationary during the periods when force is not applied thereto from the eccentric.

4. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, optical means to reimage said virtual images in registering relation and including a unit movable between a first and a second position, a rotatable eccentric, said unit being equipped with plane surfaces spaced apart at greater distances than the eccentric diameter and engageable by said eccentric periphery to effect movement of said unit from its first to its second position during initial portion only of a first half revolution of said eccentric and from its second to its first position during the initial part only of the next half revolution of said eccentric.

5. A device of the character described comprising means for feeding motion picture at uniform linear speed, a rotatable optical compensator, means to effect during movement of the film through a single picture cycle rotation of the compensator through two compensating cycles to produce two successive stationary spaced virtual images of a luminous point on the film, optical means to reimage said virtual images in registering relation and including a unit movable between a first and a second position, said unit being equipped with plane surfaces spaced apart to form a gap, a member movable to and fro in said gap for lost motion engagement with said surfaces to effect movement of said unit, and means for retaining said unit stationary during periods when force is not applied thereto from said member.

6. A device of the character described comprising means for feeding picture film at uniform linear speed, a rotatable optical compensator, means to effect during movement of the film through a single picture cycle rotation of the compensator through two compensating cycles to produce two successive stationary spaced virtual images of a luminous point on the film, optical means to reimage said virtual images in registering relation and including a unit movable between a first and a second position, and a rotatable eccentric, said unit being equipped with plane surfaces spaced apart a greater distance than the eccentric diameter and engageable by said eccentric periphery to effect movement of said unit from its first to its second position during the initial portion only of a first half revolution of said eccentric and from its second to its first position during the initial portion only of the next half revolution of said eccentric and friction means opposing movement of said unit.

7. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images if a luminous point on the film, optical means to reimage said virtual images in registering relation and including a unit movable between a first and a second position, means including a rotatable eccentric for applying force from the eccentric to the unit during the initial portion only of a half revolution of said eccentric positively to advance said unit from its first to its second position and during the initial portion only of the successive half revolution of the eccentric positively to return said unit from its second position to its first position, and friction means opposing movement of said unit.

8. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, optical means to reimage said virtual images in registering relation and including a unit movable between a first and a second position, means including a rotatable eccentric for applying force from the eccentric to the unit during the initial portion only of a half revolution of said eccentric positively to advance said unit from its first to its second position and during the initial portion only of the successive half revolution of the eccentric positively to return said unit from its second to its first position, and means for retaining the unit stationary during the periods when force is not applied thereto from the eccentric.

LUTHER W. McGINTY.

REFERENCES CITED

The following references are of record in the file of this patent:

UNITED STATES PATENTS

| Number | Name | Date |
|---|---|---|
| 2,255,892 | Leventhal | Sept. 16, 1941 |
| 2,262,808 | Leventhal | Nov. 18, 1941 |

FOREIGN PATENTS

| Number | Country | Date |
|---|---|---|
| 158,824 | Great Britain | Jan. 15, 1921 |
| 246,845 | Great Britain | July 1, 1926 |